Dec. 25, 1951     E. J. ISBISTER     2,579,497
RADIO PULSE SYSTEM
Filed Feb. 15, 1943     4 Sheets-Sheet 1

INVENTOR
Eric J. Isbister
BY
ATTORNEY

Dec. 25, 1951     E. J. ISBISTER     2,579,497
RADIO PULSE SYSTEM
Filed Feb. 15, 1943     4 Sheets-Sheet 2

Fig. 3.

INVENTOR
Eric J. Isbister
BY
ATTORNEY

Dec. 25, 1951  E. J. ISBISTER  2,579,497
RADIO PULSE SYSTEM
Filed Feb. 15, 1943  4 Sheets-Sheet 3

Fig. 5.

INVENTOR
*Eric J. Isbister*
BY
*Paul B. Hunter,*
ATTORNEY

Dec. 25, 1951      E. J. ISBISTER      2,579,497
RADIO PULSE SYSTEM
Filed Feb. 15, 1943      4 Sheets—Sheet 4

Fig. 6.

INVENTOR
Eric J. Isbister
BY
ATTORNEY

Patented Dec. 25, 1951

2,579,497

UNITED STATES PATENT OFFICE 2,579,497

RADIO PULSE SYSTEM

Eric J. Isbister, Forest Hills, N. Y., assignor to The Sperry Corporation, a corporation of Delaware Application February 15, 1943, Serial No. 476,010

24 Claims. (Cl. 343—11)

This invention relates generally to radio systems in which the reflection of a high frequency radio beam is used to detect the presence of a distant object. These systems are sometimes referred to as echo type radio systems.

The echo or reflection of radio energy has been used extensively in radio altimeters, obstacle detectors, and other radio navigation systems. It has also been used to detect, orient, and automatically track a target in radio warning and tracking systems.

The present invention particularly concerns the identification and segregation of reflections from other signals that may be received.

Examples of echo systems using the reflection of a radio beam to warn of the presence of a target and to automatically track the target are described in Patent No. 2,231,929 for "Tridimensional Radio Direction Indicator," issued February 18, 1941, in the name of Joseph Lyman, and copending application Serial No. 452,818, for "Radio Tracking Apparatus," filed July 30, 1942 in the names of Eric J. Isbister et al., now Patent No. 2,542,032, granted February 20, 1951. In prior systems such as those described in the above-mentioned patent and copending application, directional beams of high frequency radio energy are projected toward a target and that portion of the energy reflected by the target is detected by a receiver. The directional characteristics of the beams may be used to ascertain the orientation of the object relative to the antennae of the transmitter and/or receiver.

In some cases, the high frequency energy is modulated periodically by a pulse. When the energy is thus modulated an indication or measure of range may be obtained by determining the elapsed time between the transmitted pulse and reception of the reflected pulse.

When it is desired to measure range, it is necessary that the pulse by which the high frequency energy is modulated be of very short duration, that is, of the order of one microsecond. It is also necessary that the spacing between successive pulses be selected within certain limits. Since the antenna radiating the energy is constantly moving, it is necessary that successive pulses be spaced closely enough to avoid the possibility of the intermittently modulated beam skipping over a target. That is, the time interval between pulses must be coordinated with the movement of the beam so the beam will not move more than a predetermined amount between successive pulses.

The minimum limit of pulse spacing is determined by the range at which it is desired to detect a target. It is desirable that one pulse be transmitted and its reflection received before the second pulse is transmitted in order to obtain an accurate measure of range and avoid confusing reflections of successive pulses.

For the reasons described, successive pulses are usually radiated at intervals of approximately 1,000 microseconds. However, this figure is not intended in a limiting manner but merely as illustrative as one time spacing that may be used.

It is apparent that only a small amount of the radiated energy will strike a target and hence only a small amount will be reflected. Of the total energy reflected by the target only a small portion will be picked up by the receiving antenna. Therefore the receiver must be sensitive to comparatively weak signals. Since the signal to noise ratio in such systems is relatively low, automatic volume control devices merely control the average volume of the received pulse together with undesired signals including noise.

When using radio echo systems, such as those described, it is possible for the enemy to render such systems ineffective by "jamming" the same. In the case of unmodulated systems, this may be done merely by radiating energy of approximately the same radio frequency as that radiated by the system. Thus the receiver will be unable to determine whether detected signals are reflections of its transmitter radiations or the radiations of an enemy's transmitter.

In systems in which the high frequency is modulated periodically by a short pulse, the enemy may transmit radio frequency energy modulated by a frequency approximately equal to the repetition rate of the pulses. A receiver is unable to distinguish between reflected pulses and the modulated energy transmitted by the enemy.

In order to overcome these and other difficulties the present invention contemplates the use of multiple pulses. That is, instead of modulating the radio energy periodically by a short pulse, it is modulated periodically by a group of two or more pulses. The time interval between successive pulses in each group is different than the time interval between successive groups. The groups of pulses modulating the radio energy may be spaced in time an amount approximately equal to the spacing of the pulse modulations in single pulse systems.

According to the invention, the radio energy is modulated by groups of pulses having a repetition rate selected within the limits discussed above in connection with the single pulse system. Each group contains two or more pulses, the spacing of which is determined by other factors as will hereinafter appear.

In order to distinguish reflected pulses from other signals received, the receiver is made sensitive only to energy modulated by pulses and groups of pulses spaced exactly in accordance with transmitted pulses and pulse groups. Thus the receiver is sensitive to reflected signals but will reject other received signals thereby greatly reducing noise and other undesired extraneous signals.

Since the receiver is sensitive only to reflected pulses, automatic volume control devices may be utilized to the fullest extent to maintain an average level of received signals without being affected by variations in the noise level and without amplifying undesired signals along with those which it is desired to control.

One of the objects of the invention is to provide an improved radio pulse system in which energy reflected from an object may be identified and segregated from other energy.

Another object of the invention is to provide an improved radio pulse reflection system with means for eliminating noise.

A further object of the invention is to provide an improved radio pulse reflection system which is difficult for the enemy to "jam."

A still further object of the invention is to provide a radio warning and tracking system having improved automatic volumn control means whereby reflected signals may be controlled regardless of variations in other received energy.

Other objects and advantages of the invention will become apparent from the following description taken in connection with the accompanying drawings, in which.

Figure 1:
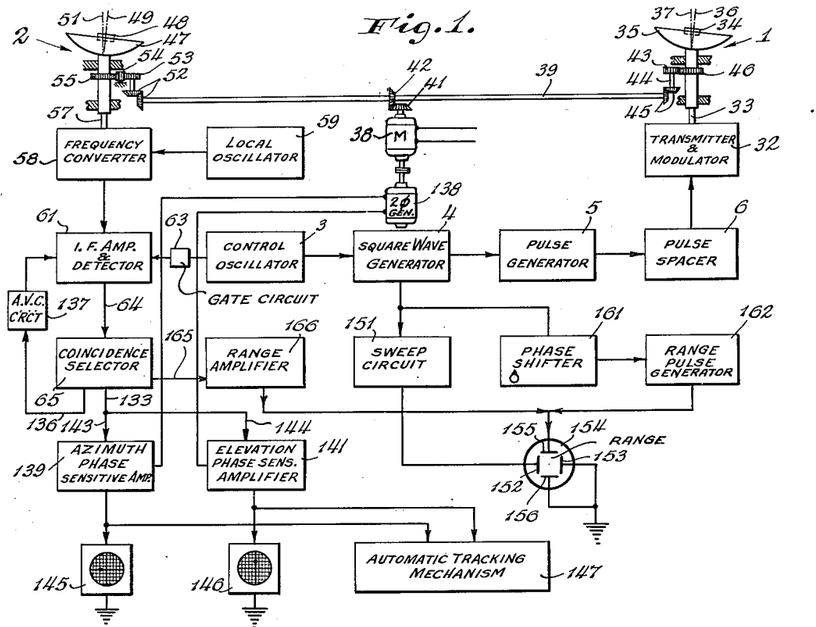
Fig. 1 is a block or flow circuit diagram of a radio warning and tracking system embodying the invention in one form.

In Fig. 1 a complete radio warning and tracking system is shown embodying the invention. High frequency energy modulated periodically by groups of multiple pulses is radiated from antenna array 1 toward a target. Energy reflected from the target is picked up by antenna 2 and fed to suitable receiving circuits wherein the groups of multiple pulses are identified and segregated from other energy that may be picked up by the antenna.

The radiation of pulses and the reception of their reflections is synchronized by control oscillator 3. The output of this oscillator is substantially a sinusoidal wave, as shown at A in Fig. 6, having a frequency equal to the desired repetition rate of groups of pulses and any desired amplitude. The oscillator may be of any suitable conventional design to produce such an output.

This sine wave output is connected to a square wave generator 4 which controls a pulse generator 5. The pulse generator is also of conventional design to periodically produce a pulse of relatively short duration. As described above, the time of this pulse is in the neighborhood of 1 microsecond. Successive pulses from the generator 5 are spaced in time an amount such that their repetition rate is equal to the frequency of the control oscillator 3.

The output of the pulse generator 5 is supplied to a pulse spacer 6 which produces groups containing two or more pulses spaced a predetermined amount in time, the groups occurring at the same rate as the repetition rate of the pulse generator 5, that is the frequency of the control oscillator 3.

Figure 2:
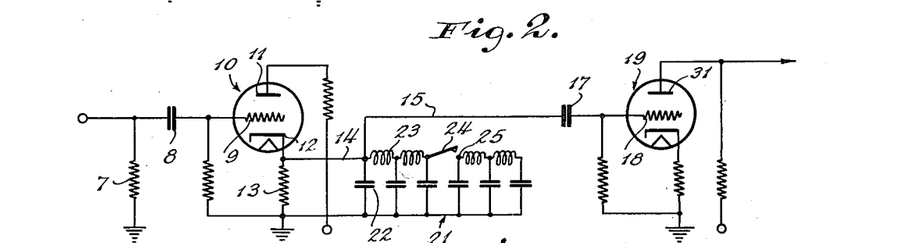
Fig. 2 is a schematic circuit diagram of a pulse spacer used in the system shown in Fig. 1.

One arrangement for transforming a single pulse from the generator 5 into two pulses is shown in the schematic circuit diagram in Fig. 2. In this diagram the single pulse output of pulse generator 5 may be considered as a positive voltage pulse appearing across resistor 7 and coupled by means of a condenser 8 to grid 9 of a tube 10. This tube might be of any suitable type in which variations in the voltage on the grid 9 will produce corresponding current variations in the circuit of cathode 12. Cathode 12 of the tube 10 is connected through a cathode resistor 13 to ground.

It will be apparent that a positive pulse on grid 9 will cause an increase in plate current thereby producing a voltage pulse across cathode resistor 13 corresponding to the output of generator 5. This voltage pulse across the resistor 13 is coupled by conductors 14 and 15 through a suitable condenser 17 to grid 18 of an amplifying tube 19. The voltage pulse across resistor 13 is also supplied by means of the conductor 14 through a section of artificial transmission line 21 composed of suitable condensers 22 and inductances 23.

When the pulse reaches the end of the artificial transmission or delay line 21, it is reflected back to the conductor 14 and then supplied through conductor 15 and coupling condenser 17 to the grid 18. The time interval between the first and second pulses reaching the grid 18 will depend upon the length of the delay line 21. As shown in Fig. 2, the delay line 21 may be varied in length by a switch 24 that is arranged to increase the length of the line by closing to contact 25.

Figure 6:
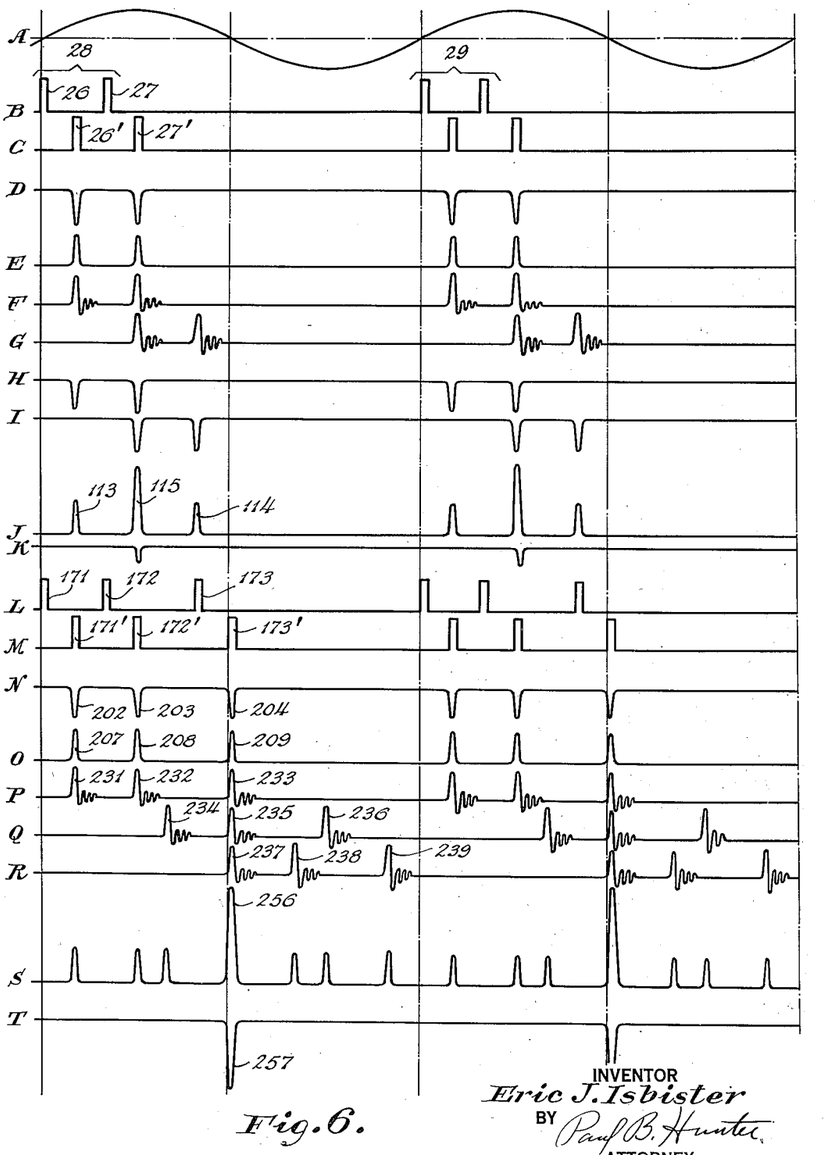
Fig. 6 shows voltage time curves for various parts of the apparatus shown in the preceding figures.

The voltage appearing on grid 18 will be similar to that shown at B in Fig. 6. The time spacing between the first and second pulses 26 and 27, respectively, will depend upon the length of the delay line 21 whereas the time spacing between two groups of pulses 28 and 29 will depend upon the frequency of control oscillator 3, that is, the repetition rate of the pulse generator 5. The output of tube 19 may be connected from plate 31 thereof, in any suitable manner, to a transmitter and modulator 32. The transmitter 32 is of conventional design for producing high frequency radio energy. This high frequency energy is modulated in accordance with the groups of multiple pulses supplied from the pulse spacer 6. The envelope of this energy will have a wave shape similar to the pulse shapes shown at B in Fig. 6 except that it will be symmetrical about zero. The spacing of the pulses and the groups of pulses is identical with the output of the pulse spacer.

The multiple pulses of high frequency energy are supplied from the transmitter and modulator 32 through a suitable wave guide 33 to the antenna array 1 which comprises a radiation element 34 and a reflector 35. The axis 36 of the element 34 and the reflector 35 is offset with respect to axis 37 about which the antenna array is rotated or spun. This spinning of the antenna is accomplished by a motor 38 which drives a shaft 39 through suitable bevel gears 41, 42. The shaft 39 drives a pinion 43 on a shaft 44 through suitable gearing 45. The pinion 43 meshes with a gear 46 on the antenna to rotate the same at a predetermined number of revolutions per second. This number of revolutions will hereinafter be referred to as the "spin" frequency of the antenna.

The energy radiated from element 34 is highly directional due to the reflections from parabola 35. The radiator and parabola are spun about an axis 37 offset with respect to the axis of the parabola to produce a radiation pattern in the form of a cone having its center coincident with the axis 37.

When energy radiating from element 34 is directed upon a target a portion of the energy will be reflected. Some of the reflected energy will be picked up by the antenna array 2 having a reflector 47 and an element 48 corresponding to the reflector 35 and the element 34 of the array 1, respectively. The axis 49 of the reflector 47 and element 48 is offset with respect to a spin axis 51 of the array 2. The antenna array 2 is rotated by shaft 39 through suitable bevel gears 52, pinion 53, idler gear 54 and a gear 55. The revolutions per second of the antenna 2 are the same as the spin frequency of the antenna 1. The two antennae are so arranged that their axes 36 and 49, respectively, will at all times be parallel. Thus a maximum quantity of the energy radiated from antenna 1 will be reflected to antenna 2.

Since the target is located at some distance from the antennae 1 and 2, the reflected pulses will be received by the antenna 2 a certain time after the pulses are radiated by the antenna 1. As was previously pointed out this time interval may be the basis for indicating a measure of the range of the target. Thus the reflected pulses may be indicated as 26' and 27' at C in Fig. 6. The time spacing between the radiated pulse 26 and received pulse 26' will vary in accordance with the range of the target.

If the spin axes 37 and 51 of the antenna are directed approximately toward the target, the amplitude of the reflected pulses will vary as the antennae are rotated about their respective spin axes and this amplitude variation will occur at the spin frequency of the antenna. It will be apparent, therefore, that the received pulses will have a wave envelope varying in amplitude at the spin frequency. The amount of this variation will depend upon the displacement of the target from the spin axis 51. Furthermore, as will hereinafter appear, the phase of this variation may be used to orient the target with respect to the axis 51.

It is not necessary that both antennae be rotated. Similar results may be obtained by spinning either one or both of the antennae. The only material difference is in the amount of reflected energy picked up by the receiving antenna. The antenna arrangement shown in the drawing is merely intended to illustrate one type of antenna that may be used in a system embodying the invention. For details of the antennae 1 and 2 reference may be had to copending application Serial No. 429,494 for "Directive Antenna Structure," filed February 4, 1942, in the name of R. J. Marshall, now Patent No. 2,531,454, granted November 28, 1950.

It is also contemplated that a single scanning antenna may be used without departing from the invention. One illustration of such an antenna may be found in copending application Serial No. 438,388, for "Scanning Devices," filed April 10, 1942, in the names of L. A. Maybarduk, et al., now Patent No. 2,410,831, granted November 12, 1946.

The energy reflected from an object is supplied from antenna 2 through a suitable wave guide 57 to radio receiving circuits including a frequency converter 58 wherein the received energy is heterodyned with energy from a local oscillator 59 to produce an interdemiate frequency that may be fed to an intermediate frequency amplifier and detector 61.

In order to reduce extraneous signals, the intermediate frequency amplifier and detector 61 may be normally inoperative and rendered operative only during a short interval following each radiated pulse. That is, the intermediate frequency amplifier may be controlled so that it will only amplify energy received during the period that reflected pulses are expected to be picked up by the antenna 2.

This may be accomplished by means of a conventional gate circuit 63 that is synchronized by the control oscillator 3 whereby it will render the intermediate frequency amplifier and detector 61 operative only for the interval during which the signals desired are expected to be received.

The output of the intermediate frequency amplifier and detector 61 is supplied through a suitable connecter 64 to a coincidence selector 65 wherein reflections of energy radiated from antenna 1 are identified and segregated in accordance with the pulse spacing in each of the groups of radiated pulses.

Figure 3:
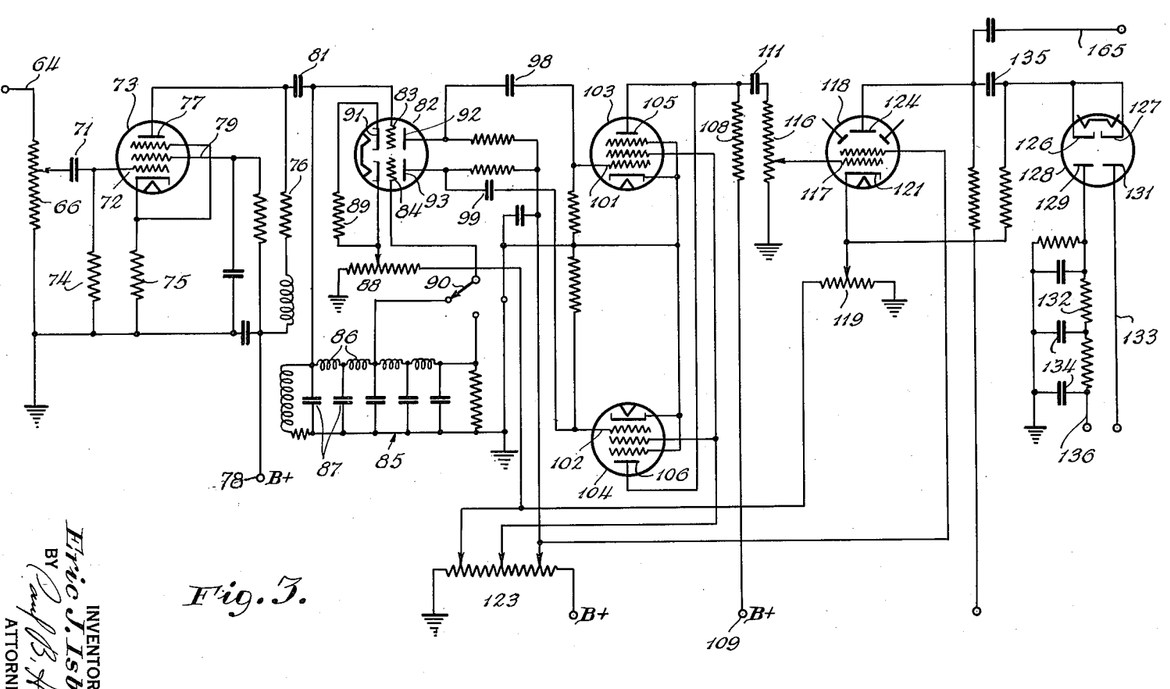
Fig. 3 is a schematic circuit diagram of a coincidence selector used in the system shown in Fig. 1.

In Fig. 3 a schematic circuit diagram of one arrangement for identifying and segregating the reflected pulses is shown. The coincidence selector shown in Fig. 3 is merely illustrative and is not intended to limit the present invention. It is contemplated that other arrangements may be substituted for the coincidence selector.

Referring to the circuit shown in Fig. 3, the output pulses of the intermediate frequency amplifier and detector 61 appear as negative voltage pulses across resistor 63 as shown at D in Fig. 6. This voltage is applied by means of a coupling condenser 71 to control grid 72 of a tube 73. Tube 73 is connected in a conventional amplifying circuit having grid and cathode resistors 74 and 75, respectively, and a load resistor 76 in the circuit of a plate 77. Suitable potentials from a source 78 are appled to the plate 77 and a screen grid 79 in a conventional manner.

The voltage applied to the grid 72 will appear as a positive voltage pulse across the resistor 76 and may be coupled by condenser 81 to a circuit including a tube 82 which, as shown in the drawings, has two sets of electrodes. The output voltage of the tube 73 may be indicated as shown at E in Fig. 6.

This output of the tube 73 is divided into two paths connected to the grid circuits for grids 83 and 84, respectively, of the tube 82. One path is connected from condenser 81 directly to the grid 83. The other path is connected through a delay line 85 before being applied to the grid 84. The delay line 85 is similar to that shown at 21 in the pulse spacer. However, its equivalent length will be approximately double the equivalent length of the delay line 21. Thus the delay line 85 is comprised of suitable inductances 86 and condensers 87 whereby the correct length will be obtained.

If the delay line 85 has a length double that of the delay line 21, the voltage applied to the grid 84 will be displaced from the voltage applied to the grid 83 by an amount equal to the time spacing between the pulses in each group transmitted by the antenna 1. A switch 90 is provided for varying the length of the delay line 85 to correspond to changes made in the length of delay line 21 by switch 24.

The voltages applied to the grids 83 and 84 may be indicated as shown at F and G, respectively, in Fig. 6. It will be apparent that the first pulse will be applied to the grid 84 at the same instant as the second pulse is applied to the grid 83. The small voltage variations following each of the pulses shown in Fig. 6 are due mainly to reflections from the delay line 85 and do not affect the operation of the coincidence selector circuit. These variations may be removed by adjusting potentiometer 88 to bias the tube 82 slightly below cut-off. The delay line 85 causes some attenuation in the voltage applied to the grid 84. To compensate for this attenuation, the amplification of the voltage applied to the grid 83 is reduced by insertion of a cathode resistor 89 in the circuit of cathode 91.

Output voltages appearing on circuits of plates 92 and 93 corresponding to the grids 83 and 84 may be indicated as shown at H and I, respectively, in Fig. 6. These output voltages are coupled by means of suitable condensers 98 and 99 to control grids 101 and 102 of coincidence selector tubes 103 and 104, respectively. Plates 105 and 106 of the tubes 103 and 104 are connected in parallel. The tubes 103 and 104 may be of any conventional type and are shown in the drawing as pentodes. The plate and screen grid voltages applied to the tubes 103 and 104 and the load are so chosen that with zero potential on the grids 101 and 102, the tubes will be operating on the slope of the loading characteristic curves thereof.

When the tubes 103 and 104 are supplied with these values and there is zero potential on both of the grids 101 and 102, a definite current will flow in the circuit of plates 105 and 106 which includes a resistor 108 whereby the voltage on the plates will be equal to the voltage applied from source 109 less the drop across resistor 108. Thus a constant voltage will be applied to a coupling condenser 111 during the quiescent state of the coincidence selector.

If equal negative signals are applied simultaneously to both of the grids 101 and 102, the current in the plate circuits of both of the tubes 103 and 104 will decrease and the drop across resistor 108 will substantially decrease. Thus the voltage applied to the condenser 111 will increase by an amount equal to the reduction in the drop across resistor 108.

If a negative signal is applied to only one of the grids, for example, the grid 101, and the other grid 102 is maintained at zero potential, the current in the tube 103 will decrease causing a comparatively small decrease in the drop across resistor 108 thus increasing the voltage applied to the plates 105 and 106. The increase of the voltage applied to plate 106 will cause an increase in the current through the tube 104 thus tending to restore the drop across resistor 108. Since the current in one tube is decreased and that in the other tube is increased, the resultant change in the voltage drop across resistor 108, and therefore the output voltage applied to condenser 111, will be comparatively small.

From the foregoing, it will be apparent that signals applied simultaneously to the grids of the two coincidence selector tubes 103 and 104 will cause a relatively large change in the voltage applied to the condenser 111 whereas a corresponding signal applied to only one of the tubes will cause only a small variation in the voltage applied to condenser 111.

Since the voltage applied to the grids 101 and 102 as the result of reception of reflected pulses will be similar to that shown at H and I in Fig. 6, a voltage due to the second received pulse will be applied to the grid 101 at the same instant as a voltage corresponding to the first received pulse is applied to the grid 102. Thus the output voltage applied to the condenser 111 will be similar to that shown at J in Fig. 6 whereby voltages applied to only one of the grids will cause a small change in output voltage such as 113 and 114 (Fig. 6) and voltages applied simultaneously to both grids will produce a relatively large change 115 in the output voltage.

These output voltages are coupled through the condenser 111 and a variable resistor 116 to control grid 117 of a tube 118. This tube is normally biased to cut-off by a voltage from a potentiometer 119 connected across a suitable source 123. By adjusting the variable resistor 116 and the potentiometer 119 the tube 118 may be controlled so it will only produce an output voltage in the circuit of plate 124 when the input voltage is relatively high. In this manner only the peaks of the high voltages 115 (Fig. 6) will permit current to flow in the tube 118. Other voltages will not be sufficient to overcome the bias. It will be apparent that a signal will appear at condenser 135 only when voltages are applied simultaneously to the grids 101 and 102 of the coincidence selector tubes 103 and 104 whereby a large signal 115 is applied to the control grid 117 of the tube 118. The output of tube 118 may be represented as shown at K in Fig. 6.

The only signal appearing in the output circuit of the tube 118 will be a voltage pulse corresponding to the reflection of the second pulse of each group of radiated pulses. As may be seen from the wave shapes shown at J and K in Fig. 6, the tube 118 will reject all other signals. Even if the noise level is above the level of reflected pulses, noise signals will not be passed by the tube 118. For this reason, the present system is useful in all types of echo systems where reception is difficult due to the relatively low signal strength of reflected energy.

As previously explained, the envelope of the pulses supplied to the coincidence selector varies in amplitude at the spin frequency of the antennae. Hence, the voltage pulses applied to the coupling condenser 135 will likewise vary in amplitude at the spin frequency. These varying potentials are applied to cathodes 126 and 127 of a rectifier 128. The voltage appearing on plates 129 and 131 of the rectifier are identical and will be pulsating direct current voltages, the pulsations being substantially sinusoidal and varying in amplitude at the spin frequency in accordance with the displacement of the target from the spin axis of the antennae.

The voltage from the plate 129 is connected through an averaging network containing suitable resistance 132 and condensers 134 having a time constant such that it will average variations in voltage from the plate 129 provided the variations do not exceed a certain frequency below the spin frequency. By averaging is meant deriving a signal proportional to the instantaneous average of the direct current component of the original voltage. This average signal will have a direct current component related to the range and an alternating current component due to signal fading.

The output of the averaging network is supplied through a connector 136 to a suitable automatic volume control circuit 137 (Fig. 1) which may be of any conventional type. The automatic volume control circuit 137 produces a voltage that may be inserted in the intermediate frequency amplifier and detector 61 to maintain the average output of the coincidence selector substantially constant except for the spin frequency variation of the wave envelope of the pulses.

The output of the other plate 131 of the detector tube 128 as represented by connector 133 carries a pulsating direct current voltage varying in amplitude at the spin frequency of the antennae. This output may be connected through suitable phase sensitive amplifiers to ascertain the azimuth and elevation components of the displacement of the axis 51 from the target.

A two-phase generator 138 having its windings displaced substantially 90 electrical degrees is mechanically connected to the motor 38 whereby it is driven at the spin frequency. The output of one phase of this generator is supplied to azimuth phase sensitive amplifier 139 and the other winding is connected to elevation phase sensitive amplifier 141. These phase sensitive amplifiers may include any conventional phase comparing circuit such as a balanced demodulator in which the phase of the envelope of signal from the coincidence selector is compared with the phase of the signal from one winding of the two-phase reference generator 138. As is well known, this may be accomplished by arranging a pair of the thermionic tubes in a balanced circuit and applying one signal in like phase to both tubes and the other signal in phase opposition to both tubes. If the generator 138 is adjusted so the voltage in one winding reaches a peak when the azimuth position of the antenna is a maximum and the output of the other winding reaches a peak when the elevation position of the antenna is a maximum, the voltages in the respective windings may be compared in phase with the voltage output of the coincidence selector 65 to determine the azimuth and elevation displacements of the axis 51 from the target. The output of the coincidence selector is supplied by connectors 143 and 144 to the phase sensitive amplifiers 139 and 141. The voltage output of the phase sensitive amplifier 139 is proportional to the phase difference between the voltage of one of the windings of the generator 138 and the voltage output of the coincidence selector 65. This voltage output of the amplifier 39 may be applied to the deflecting plates of a cathode ray tube 145 to indicate the azimuth displacement of the axis 51 from the target.

Similarly, elevation phase sensitive amplifier 141 produces an output proportional to the phase difference between the other winding of the two-phase generator 138 and the output of the coincidence selector 65. This output is applied to the deflecting plates of a cathode ray tube 146 to indicate the elevation displacement of the axis 51 from the target.

The supports and mechanisms for controlling the elevation and azimuth position of the antennae are not shown in the drawings. One support suitable for the purpose is shown in the above-mentioned Patent No. 2,231,929.

The outputs of the amplifiers 139 and 141 may also be connected to an automatic tracking mechanism 147 that will operate in response to the phase displacements from the amplifiers 139 and 141 to actuate suitable servo devices that will move the antennae toward the target. For a description of an automatic tracking mechanism using only one scanner, reference may be had to copending application Serial No. 441,188, for "Radio Gun Control System," filed May 18, 1942, in the names of C. G. Holschuh et al.

It will be apparent that the multiple pulse system thus far described may be used in object detection systems, radio searching systems, and automatic tracking systems for training search lights, guns, or other instruments on a moving target. It also may be used in obstacle locating systems, radio altimeters, and other navigation systems wherein an indication or measure of the distance of an object from the antenna is desired. One arrangement for measuring the range of an object will now be described.

When energy radiated from the antenna 1 is reflected to the antenna 2, the range may be measured or indicated by elapsed time between radiation of a pulse and reception of a reflected pulse. The control oscillator 3 acts through square wave generator 4 and a sweep circuit 151 to apply a sweep voltage to the horizontal deflecting plates 152 and 153 of a range cathode ray indicator tube 154. This sweep voltage has a frequency corresponding to the repetition rate of the pulses.

The output of the square wave generator 4 is connected through a variable phase shifting network 161 to control a range pulse generator 162, the output of which is normally adjusted by the phase shifter 161 to correspond to the second pulse of each group of pulses modulating the radiated energy. By applying the output of the pulse generator 162 to the vertical deflecting plates 155 and 156 of the tube 154 a pulse will appear on the screen of the tube corresponding to the second radiated pulse. A connector 165 from the output circuit of tube 118 in the coincidence selector 65 is connected through a suitable amplifier 166 to the vertical deflecting plate 155. The voltage in connector 165 is the same as that shown at K in Fig. 6. The amplifier 166 adjusts the voltage suitably for application to the vertical deflecting plates 155 and 156 of the cathode ray tube 154. Thus a second pulse will appear on the screen of the tube corresponding to the reflection of the second radiated pulse. The difference in the spacing of the pulse from the coincidence selector and the pulse from the range generator will correspond to the range of the target.

By adjusting phase shifter 161 until the range generator pulse appears coincident with the reflected pulse on the screen of the cathode ray tube 153, the range of the target may be measured as a function of the phase shift required.

The circuits for applying the two pulses to the vertical plates may be adjusted so one pulse will appear as a pedestal and the other pulse as a peak on the pedestal. Alternatively, the pulses may appear identical and be adjusted until they are coincident to determine the range.

The echo pulse system described provides periodic groups of two pulses. These pulses are segregated from other received signals by a coincidence selector which is sensitive to simultaneous signals that are provided by delaying one pulse of a group to coincide with the later pulse. It is possible that some noise may come through the coincidence selector if identical noise peaks occur at the same time interval as the spacing between the two pulses of a group. Although this is very improbable, it is, of course, possible.

A two pulse system may be "jammed" by the enemy. The receiving circuits described for a two pulse system would also be sensitive to high frequency energy of substantially the same frequency as that radiated, which is also modulated by a frequency corresponding to the frequency of the two pulses in a group. This is considerably more difficult for the enemy to accomplish than the modulation of a radio frequency by a frequency equivalent to the repetition rate, that is, the repetition rate of the groups of pulses in the present case.

If the enemy does manage to identify the frequency of successive pulses, as distinguished from the repetition rate of groups of pulses, the frequency of successive pulses may be easily changed by adjusting switches 24 (Fig. 2) and 90 (Fig. 3) to vary the spacing between the pulses. Thus the radiated pulses would be spaced differently and the coincidence selector would be adjusted to be sensitive to the differently spaced pulses. In order to "jam" the system, the enemy would have to change the modulation frequency of the "jamming" signal.

By providing a three pulse system the possibility of "jamming" and the possibility of noise coming through the coincidence selector may be even further reduced. A triple pulse system may be made very effective by using different time spacing between the three pulses in each group.

The apparatus of the multiple system would be substantially the same as that heretofore described with the exception of the pulse spacer 6 and the coincidence selector 65. The pulse spacer 6 for a triple pulse system is shown in detail Fig. 4. Since many elements in this system are equivalent to those shown in Fig. 2, the same reference numerals have been used to identify these elements. This pulse spacer converts a single pulse input across resistor 7 from the pulse generator 5 into three unevenly spaced pulses 171, 172, and 173 as shown at L in Fig. 6.

Figure 4:
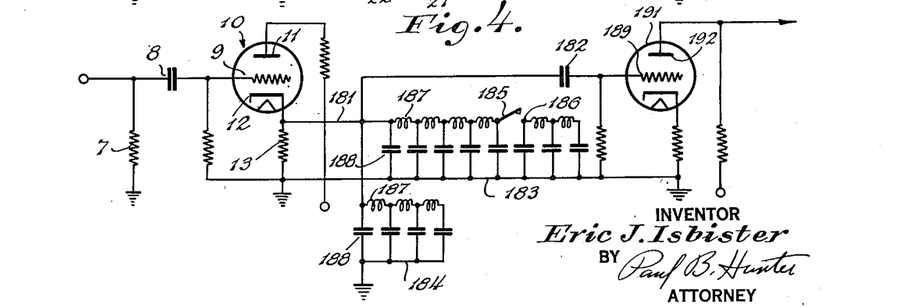
Fig. 4 is a schematic circuit diagram similar to Fig. 2 but showing a modified form of a pulse spacer.

The pulse across resistor 7 is coupled through condenser 8 to grid 9 of the tube 10. Variations in current in the circuit of cathode 12 develop voltages across resistor 13 corresponding to the input pulse. The voltages across resistor 13 are connected as by connector 181 to a coupling condenser 182. These voltages are also connected to delay line 183 and a delay line 184.

The delay lines 183 and 184 are composed of suitable inductances 187 and condensers 188 and have different lengths. Thus the voltage in conductor 181 will be simultaneously applied to the delay lines and reflections from the delay line 184 and will be applied to the condenser 182 definite time intervals after voltage pulses direct from resistor 13 are applied thereto. Similarly, pulses from the delay line 183 will be spaced an additional amount in time from the two preceding voltages.

In order to prevent jamming, it is desirable that the spacing between the second and third pulses be such that it has a non-integral relation with the spacing between the first and second pulses. The relative spacing of the pulses is readily adjusted by varying the effective length of the delay line 183. This may be accomplished by closing switch 185 to contact 186, thereby adding additional inductances and condensers to the line. When the switch is closed, the spacing between the second and third pulses will be increased. Additional adjustments may be had by inserting similar switches at various points in the delay lines 183 and 184.

These three successive voltage pulses are applied from the condenser 182 to grid 189 of tube 191. The output in the circuit of plate 192 will consist of voltage pulses such as 171, 172, and 173 as shown at L in Fig. 6. These voltages are supplied to the transmitter and modulator 132 in the same manner as that previously described in connection with the double pulse system.

The pulses of high frequency energy radiated from antenna 1 will also be spaced in time similar to the voltage pulses 171, 172, and 173. A target located within the radiation pattern of the antenna will reflect these pulses to the antenna 2. The reflected pulses will be displaced in time an amount proportional to the range of target and will vary in amplitude at the spin frequency in accordance with displacement of the target from the axes 37 and 51. The reflected pulses are supplied through the receiving circuits including the frequency converter 58 and intermediate frequency amplifier and detector 61 to coincidence selector 65. The received pulses are shown at M in Fig. 6 and are designated 171′, 172′, and 173′.

Negative pulses corresponding to the received pulses are applied through conductor 64 to the coincidence selector 65. The coincidence selector used in a three pulse system is shown in detail in Fig. 5. The negative pulses from connector 64 appear across resistor 201 as pulse voltages such as 202, 203, and 204 as shown at N in Fig. 6. These voltages are applied to the grid 205 of an amplifying tube 206 corresponding to the tube 73 in the double pulse system (Fig. 2).

Output voltage pulses 207, 208, and 209, as shown at O in Fig. 6, in the circuit of plate 211 of the tube 206 are applied through a suitable coupling condenser 212 to grid 213 of a tube 214 corresponding to one portion of the tube 82. These voltage pulses are also supplied to a delay line 215 which is composed of suitable inductances and condensers 217 and 218 to give the line a length equivalent to double the length of the delay line 183 (Fig. 4). A switch 225 is provided for changing the effective length of the delay line 215 according to the position of the switch 185 in the delay line 183. Grid 219 of tube 221 is connected to a point in the delay line 215 displaced from the grounded termination of the line a distance that is equivalent to double the length of the delay line 184. In this manner, received signals are supplied to the grid 219 through a delay line that is equivalent to double the difference between the effective lengths of the delay lines 183 and 184 (Fig. 4). Grid 223 of tube 224 is connected to a point at the end of delay line 215 that is equivalent to double the length of the delay line 183, when the switch 225 is open or closed depending upon the position of the switch 185.

By means of the connections of the grids 213, 223, and 219 through the delay line 215, voltage pulses 207, 208, and 209 (Fig. 6) will be applied to these respective grids at delayed intervals corresponding to the time intervals between the three pulses. Therefore, the pulses applied to grid 223 are delayed an interval corresponding to the time spacing between the first pulse 207 and the third pulse 209, and the pulses applied to the grid 219 are delayed an interval corresponding to the time spacing between the second pulse 208 and the third pulse 209. In order to compensate for attenuation in the delay line 215, bias resistors 220 and 222 are inserted in the cathode circuits of the tubes 214 and 221, respectively, to adjust their amplification relative to the tube 224.

Voltages 231, 232, and 233 as shown at P in Fig. 6, are applied to the grid 213 of the tube 214; voltages 234, 235, and 236, as shown at Q in Fig. 6, are applied to grid 219 of tube 221 and voltages 237, 238, and 239, as shown at R in Fig. 6, are applied to the grid 223 of the tube 224. By referring to Fig. 6 it will be apparent that voltage pulse 233 corresponding to the third pulse, voltage pulse 235 corresponding to the second pulse, and voltage pulse 237 corresponding to the first pulse, will be applied simultaneously to the grids of tubes 214, 221, and 224, respectively.

Figure 5:
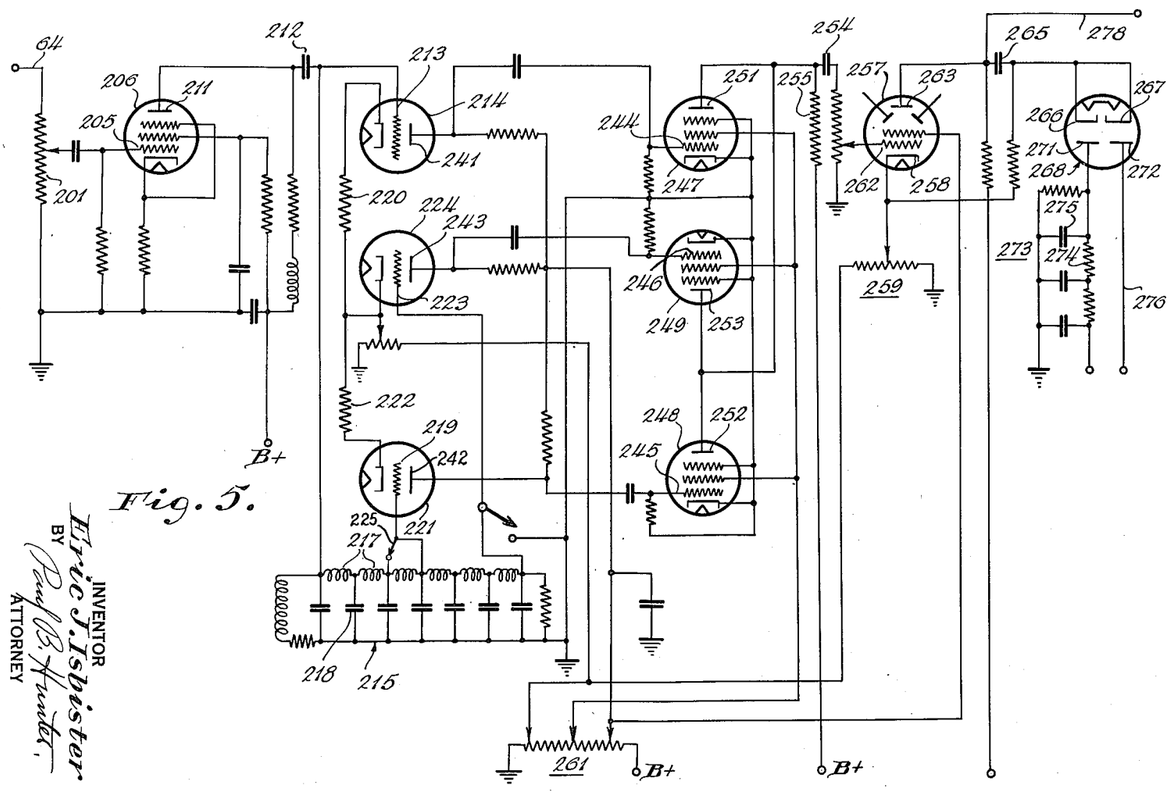
Fig. 5 is a schematic circuit diagram similar to Fig. 3 but showing a modified form of a coincidence selector.

Negative pulses from plates 241, 242, and 243 of the tubes 214, 221, and 224, respectively, will be applied to grids 244, 245, and 246 of coincidence selector tubes 247, 248, and 249. At one interval during each group of pulses, negative pulse will be applied simultaneously to the grids of the three coincidence selector tubes.

Plates 251, 252, and 253 of the tubes 247, 248, and 249, respectively, are connected in parallel to produce a common output at coupling condenser 254. As was previously explained in connection with the double pulse system, the simultaneous application of negative pulses to the grids of these tubes will produce a relatively large output voltage as compared to the output voltage produced when only one or two of the grids are so energized.

The reason for this is due to the loading characteristics of tubes such as the pentodes shown in the drawings. When negative voltages are applied simultaneously to each of the tubes, the plate current in each tube will be decreased and the total current flowing in all of the tubes will be substantially decreased thus reducing the drop in resistor 255 and substantially increasing the voltage at condenser 254.

On the other hand, if negative voltages are applied to only one or two of the grids, only the plate current drawn by these tubes will be reduced thereby reducing the drop in resistor 255 and increasing the plate voltage applied to the remaining tube or tubes. This increase in plate voltage causes an increase in the current of the tube whose grid is not negatively excited thus tending to neutralize the drop in the resistor 255. The result is a comparatively small change in the voltage at condenser 254. The voltages appearing at condenser 254 as a result of the voltages applied to the grids of the coincidence selector tubes may be indicated as shown at S of Fig. 6. It will be noted that the peak of the output voltage occurring when the voltage pulses are coincident, is substantially larger than the output voltages otherwise occurring.

Since this peak 256 is larger than other output voltages, it may be segregated by applying it to the grid of a tube 257 corresponding to the tube 118 of Fig. 3 which is normally biased to cut-off by applying a voltage to the cathode 258 by a potentiometer 259 connected across a suitable source 261. If the output of the coincidence selector tubes 247, 248, and 249 is applied to grid 262 of the tube 257, voltages appearing in the output circuit of plate 263 may be indicated as shown at T in Fig. 6, that is, merely the peak of the voltage output 256 of the coincident selector tubes. For the reason previously explained in connection with the double pulse system, this output of the tube 257 is free from noise and other undesired signals, even though the level of such undesired signals is above the level of the received pulses. By comparing the wave shapes shown at S and J in Fig. 6, it will be apparent that the triple pulse system is even more effective than the double pulse system.

The output of plate 263 may be coupled by means of a condenser 265 to cathodes 266, 267 of a detector tube 268. The plates 271, 272 representing the outputs of the detector tube are connected to an averaging network 273 consisting of suitable resistors and condensers 274 and 275 and to a direct output represented by conductor 276.

The time constant of averaging circuit 273 is such that it will average variations in the output of plate 271 up to a certain frequency below the spin frequency as described in connection with the two pulse systems. The output of averaging circuit 273 is connected to an automatic volume control circuit 137 in a manner similar to that previously described.

Conductor 276 is similar to conductor 133 and is connected to azimuth and elevation phase sensitive amplifiers 139 and 141. Another conductor 278 is connected from the output of the tube 257 to the range amplifier 166.

The underlying principles of the two and three pulse systems described are substantially the same. Any number of pulses may be used by rearranging the spacing and selecting circuits.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an echo type radio pulse system, means for identifying energy reflected from an object comprising an oscillator for generating a certain frequency, a transmitter for radiating a plurality of groups of pulses irradiating said object at intervals controlled by the frequency of said oscillator including means for spacing the pulses in each group at intervals different from that between groups, a normally inoperative receiver for receiving energy reflected from said object, means controlled by said oscillator rendering said receiver operative during intervals immediately following the radiation of said pulses, and means responsive to the energy pulses having the requisite time spacing for segregating such pulses from other received energy.

2. In an echo type radio pulse system, means for identifying energy reflected from an object comprising a transmitter for radiating energy periodically modulated by a plurality of short pulses to irradiate said object, a receiver for receiving energy reflected from said irradiated object, means responsive to energy having the requisite modulation for segregating such energy from other received energy, and means responsive to said segregated energy for controlling said receiver to maintain the average level of said segregated energy substantially constant.

3. In an echo type radio pulse system, means for identifying energy reflected from an object comprising an oscillator for producing a certain frequency, a transmitter for radiating energy to irradiate said object, said energy being modulated by a plurality of pulses periodically in accordance with the frequency of said oscillator, a normally inoperative receiver for receiving energy reflected from said irradiated object, means responsive to energy from said control oscillator for rendering said receiver operative during intervals immediately following the radiation of said pulses, means responsive to energy having the requisite modulation for segregating such energy from other received energy, and means responsive to said segregated energy for controlling said receiver to maintain the average level of said segregated energy substantially constant.

4. In an echo type radio pulse system, means for identifying energy reflected from an object comprising an oscillator for producing a certain frequency, means controlled by energy from said oscillator for periodically producing a plurality of pulses at intervals corresponding to said certain frequency, a generator of high frequency energy, a radiator coupled to said generator and adapted to irradiate said object with said energy means for modulating said high frequency energy by said plurality of pulses, a normally inoperative receiver for receiving energy reflected from said irradiated object, means synchronized by energy from said control oscillator for rendering said receiver operative during intervals following the radiation of said energy pulses, means responsive to energy having the requisite modulation for segregating such energy from other received energy, and means actuated by said segregated energy for controlling said receiver to maintain the average level of said segregated energy substantially constant.

5. An object locating system comprising a generator of high frequency energy, means for periodically modulating said energy by successive groups of a plurality of short pulses arranged at intervals greater than that between pulses, an antenna for radiating said modulated energy to irradiate an object, an antenna for receiving energy reflected from said object, means for scanning one of said antennae over a predetermined portion of space, a receiver for detecting energy received by said receiving antenna, means responsive to energy pulses having the requisite time spacing therebetween so as to segregate such energy pulses from other received energy, and indicating means responsive to said segregated energy and the position of the scanning antenna for indicating the orientation of said object.

6. In an echo type radio pulse system, the method of identifying energy reflected from an object comprising the steps of producing successive groups of a plurality of pulses having the same time duration spaced in time relation at intervals different from that between groups, irradiating said object by means of energy modulated by said spaced pulses, receiving energy pulses reflected from said distant object, and segregating said energy pulses having the requisite time spacing from other received energy in accordance with the time spacing of said pulses.

7. In an echo type radio pulse system, the method of identifying energy reflected from an object comprising the steps of irradiating said object by successive modulated groups of a plurality of pulses having the same time duration spaced at time intervals different from that between groups, receiving energy reflected from an object, and segregating energy pulses having the requisite spacing from other received energy in accordance with the modulation thereof.

8. In an echo type radio pulse system, the method of identifying energy reflected from an object comprising the steps of radiating energy modulated by groups of a plurality of pulses, receiving energy reflected from an object, dividing said received energy into a plurality of paths, delaying said paths relative to each other by amounts corresponding to the time spacing of the pulses in each of said groups, and selecting coincident outputs of said paths to segregate said reflected energy from other received energy.

9. The method of determining the range of a distant object comprising the steps of irradiating said object by radio energy modulated by successive groups of a plurality of pulses spaced at intervals different from that between groups, receiving energy reflected from the irradiated object, segregating received signals having the requisite group spacing from other received signals and measuring the time difference between one pulse in each of said transmitted and received groups.

10. In an echo type radio pulse system, means for identifying energy reflected from an object comprising a transmitter for irradiating said object with energy modulated by groups of pulses at selected intervals including means for spacing the pulses in each group at time intervals different from that of said groups, a receiver associated with said transmitter for receiving energy reflected from said object, and means responsive to the time spacing of said pulses for segregating energy having the requisite modulation from other received energy.

11. In an echo type radio pulse system, means for identifying energy reflected from an object comprising transmitter means for producing successive groups of a plurality of energy pulses and irradiating said object therewith, the time spacing between pulses of each group being different from that between groups, a receiver for receiving energy reflected from said object, means responsive to energy pulses having the requisite time spacing therebetween for segregating such energy from other received energy, and means responsive to said segregated energy for controlling said receiver to maintain the average level of said segregated energy substantially constant.

12. In an echo type radio pulse system, means for identifying energy reflected from an object comprising transmitter means for producing and radiating energy to irradiate said object, said energy being modulated by successive groups of two pulses of equal time duration spaced at intervals different from that between successive groups, a receiver for receiving reflected energy from said irradiated object, and means connected to said receiver responsive to energy pulses having the requisite spacing between said pair of pulses for segregating such energy from other received energy.

13. In an echo type of radio pulse system, means for identifying energy reflected from an object comprising transmitter means for producing and radiating energy to irradiate said object, said energy being periodically modulated by groups of more than two pulses spaced at different time intervals, a receiver associated therewith for receiving reflected energy from said irradiated object, and means connected to said receiver responsive to energy pulses having the requisite spacing between said pair of pulses for segregating such energy from other received energy.

14. In an echo type radio pulse system, means for identifying energy reflected from an object comprising transmitter means for producing and radiating energy to irradiate said object, said energy being modulated by successive groups of at least three pulses spaced at different time intervals having a non-integral relation, a receiver connected to said transmitter for receiving reflected energy from said irradiated object, and means connected to said receiver responsive to energy pulses having the requisite spacing for segregating such energy from other received energy.

15. In an echo-type radio pulse system, apparatus for identifying energy reflected from an object, comprising means irradiating said object with a group of predeterminedly spaced radio energy pulses, normally inactively receiving means receiving reflections of energy from said irradiated object, and further means preventing passage of reflections of energy as a function of said predetermined group spacing between pulses.

16. In an echo-type radio pulse system, means for identifying energy reflected from an object comprising an oscillator for producing a certain frequency, means controlled by energy from said oscillator for periodically producing a plurality of pulses at intervals corresponding to said certain frequency, a generator of high frequency energy, a radiator coupled to said generator and adapted to irradiate said object with said energy, means for modulating said high frequency energy by said plurality of pulses, a normally inoperative receiver for receiving energy reflected from said irradiated object, means synchronized by energy from said controlled oscillator for rendering said receiver operative during intervals following the radiation of said energy pulses, a coincidence selector responsive to energy having the requisite modulation, said coincidence selector having as one of its components a time-delay line, for segregating such energy from other received energy, and means actuated by said segregated energy for controlling said receiver to maintain the average level of said segregated energy substantially constant.

17. In an echo-type radio pulse system, means for identifying energy reflected from an object comprising an oscillator for producing a certain frequency, a pulse spacer controlled by energy from said oscillator for periodically producing a plurality of pulses at intervals corresponding to said certain frequency, said pulse spacer having as one of its components a time-delay line, a generator of high frequency energy, a radiator coupled to said generator and adapted to irradiate said object with said energy, means for modulating said high frequency energy by said plurality of pulses, a normally inoperative receiver for receiving energy reflected from said irradiated object, means synchronized by energy from said controlled oscillator for rendering said receiver operative during intervals following the radiation of said energy pulses, a coincidence selector responsive to energy having the requisite modulation, said coincidence selector having as one of its components a time-delay line which is substantially twice that of the time-delay line utilized in said pulse spacer, for segregating such energy from other received energy, and means actuated by said segregated energy for controlling said receiver to maintain the average level of said segregated energy substantially constant.

18. In a pulse echo system for identifying reflected radio energy pulses, a coincidence selector comprising a negative energy input thereto, a first stage comprising a vacuum tube amplifier, a second stage comprising two parallel amplifiers coupled to said first stage and having one of said parallel amplifiers coupled to said first stage through a time-delay line, whereby the output signal from said first stage appears at a time unequal to that appearing on the grid of said other amplifier of said second stage, a third stage comprising a pair of amplifiers connected in parallel, each of said amplifiers being coupled to the output of one of the previous amplifiers of the second stage, a fourth stage comprising an amplifier connected in series to the output of each amplifier of said third stage, a fifth stage comprising a rectifier having two joined cathodes and two separate anodes coupled to said fourth stage, and a filter circuit connected in one of the plate circuits of said rectifier.

19. In an echo-type radio pulse system, means for identifying radio energy reflected from an object comprising means for irradiating said object with predeterminedly spaced groups of radio energy pulses, each of said groups including a plurality of individual pulses having equal time duration, means for receiving radio energy, and means included therein responsive only to said spaced energy pulse groups so as to segregate such energy pulses from other radio energy.

20. In an echo-type radio pulse system, means for identifying radio energy reflected from an object comprising means for irradiating said object with predeterminedly spaced groups of radio energy pulses, each of said groups including a plurality of individual pulses of equal time duration, the spacing between said pulse groups being different than that between individual pulses included in each of said groups, normally insensitive receiving means, and means connected to said irradiating means for activating said receiver.

21. In an echo-type radio pulse system, apparatus for identifying energy reflected from an object irradiated with radio energy comprising means for irradiating said object with groups of a plurality of individual variably spaced radio pulses of equal time duration, means for receiving radio energy signals, and means included therein for preventing the passage of all radio signals except such radio pulse groups having the aforesaid spacing and time arrangement.

22. A range determining system comprising transmitter means for producing a radiating energy to irradiate an object, said energy being modulated by successive groups of a plurality of pulses having the same time duration spaced at intervals different from that between groups, a receiver for receiving energy reflected from said irradiated object, means responsive to energy pulses having the requisite spacing for segregating such energy pulses from other received energy, and means responsive to said transmitter and said segregated energy pulses for providing a measure of the time interval between the transmission and reception of each group of pulses.

23. The method of detecting the presence of a distant object comprising the steps of; irradiating said object with energy successively modulated by groups of a plurality of individually spaced pulses; receiving energy pulses having the same time duration reflected from said object, said groups being separated by a time greater than a group duration; segregating said pulses having the requisite spacing therebetween from other received energy; and utilizing said segregated energy to indicate the presence of said object.

24. The method of determining the orientation of a distant object comprising the steps of: irradiating said object with energy successively modulated by groups of a plurality of individually spaced pulses, said groups being separated by a time greater than a group duration; scanning a portion of space with a receiver having a directional axis to receive energy reflected from said object; segregating pulses having the requisite spacing therebetween from other received energy; and utilizing said segregated energy to indicate the direction of the axis of said receiver during the reception of said energy.

ERIC J. ISBISTER.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,089,639 | Bedford | Aug. 10, 1937 |
| 2,199,634 | Koch | May 7, 1940 |
| 2,227,598 | Lyman et al. | Jan. 7, 1941 |
| 2,266,401 | Reeves | Dec. 16, 1941 |
| 2,403,600 | Holmes | July 9, 1946 |
| 2,415,095 | Varian | Feb. 4, 1947 |
| 2,416,088 | Deerhake | Feb. 18, 1947 |
| 2,422,074 | Bond | June 10, 1947 |
| 2,423,082 | Busignies | July 1, 1947 |
| 2,424,984 | Hoffman | Aug. 5, 1947 |
| 2,453,970 | Charrier | Nov. 16, 1948 |
| 2,487,995 | Tucker | Nov. 15, 1949 |

FOREIGN PATENTS

| Number | Country | Date |
| --- | --- | --- |
| 528,192 | Great Britain | Oct. 24, 1940 |